No. 704,355. Patented July 8, 1902.
J. S. MOON.
ANIMAL TRAP.
(Application filed Jan. 6, 1902.)
(No Model.)
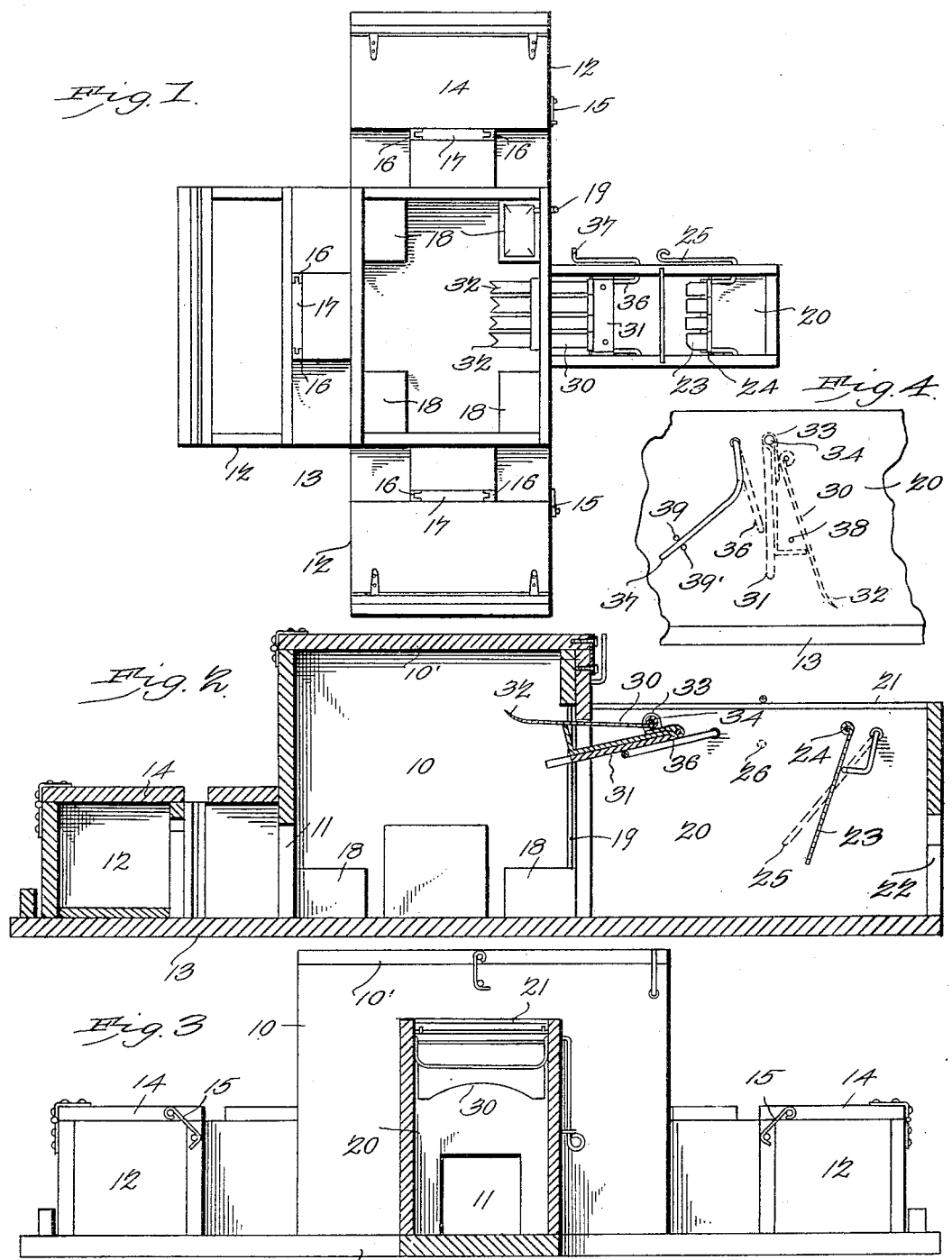
Witnesses
E. F. Stewart
S. M. McColl
J. S. Moon, Inventor.
by C. A. Snow & Co.
Attorneys
THE NORRIS PETERS CO., PHOTO-LITHO., WASHINGTON, D. C.

UNITED STATES PATENT OFFICE.

JOSEPH SAMUEL MOON, OF NEVADA, MISSOURI.

ANIMAL-TRAP.

SPECIFICATION forming part of Letters Patent No. 704,355, dated July 8, 1902.

Application filed January 6, 1902. Serial No. 88,674. (No model.)

*To all whom it may concern:*

Be it known that I, JOSEPH SAMUEL MOON, a citizen of the United States, residing at Nevada, in the county of Vernon and State of Missouri, have invented a new and useful Animal-Trap, of which the following is a specification.

This invention relates to animal-traps and is especially designed as a rat-trap.

The object of the invention is to provide a structure for harboring rats or other animals in which they are permitted to go in and out at will until they have become thoroughly acquainted and take up their permanent abode therein, when the trap may be so arranged or set that the animals after once going in cannot get out and are imprisoned, when they may be taken away and disposed of.

Figure 1 of the accompanying drawings represents a plan view of this improved trap, showing the tops removed from the central bait-chamber and from the runway forming the entrance thereto, whereby the internal arrangement of these parts may be seen. Fig. 2 represents a longitudinal vertical section thereof. Fig. 3 represents a front elevation thereof with the entrance-runway shown in section. Fig. 4 represents a side elevation of a portion of the entrance-runway, showing the crank-handle for operating the trapping-gate, which is shown in dotted lines in lowered trapping position.

The same reference-numerals indicate corresponding parts in all the figures.

In the drawings a central or feeding chamber 10 is shown, having runways, as 11, leading therefrom to boxes or chambers, as 12, which are adapted to be used as nests or bed-chambers for the animals frequenting the trap. Any desired number of these chambers, as 12, may be employed, one opening into the other and separably connected; but in the form illustrated three only are shown, which lead directly from the main feeding-chamber 10. The trap is preferably formed with a common base 13, which serves as a bottom for the chamber 10 and the runways opening therefrom. The nests or bed-chambers, as 12, are made detachable, having bottoms of their own, so that they may be removed from the trap proper and carried away with their contents securely fastened up therein. They are preferably provided with hinged doors or tops, as 14, having hooks, as 15, which are adapted to engage pins on the side of the box-like chamber, as 12, and hold it against accidental opening. These chambers, as 12, are also provided with openings at the fronts thereof, which communicate with the runways, as 11, and are provided along the sides thereof with vertical strips, as 16, for receiving sliding doors, as 17, for closing them when desired.

The central feed or bait chamber 10 is preferably provided with food-boxes, as 18, which are made of some thin material through which the animals may gnaw and readily get to the contents thereof. These boxes are closed to render them less suspicious and cause the animals no uneasiness as to its being a bait for them. These boxes may be supplied in any desired manner, preferably through pipes or chutes, as 19, through which the food, such as grain and the like, may be fed from the top. One of these receptacles, as 18, is preferably made in the form of a trough for holding water, milk, or other liquid and is supplied through a tube, as just described, or the top 10' of the chamber 10 may be opened and the food and drink placed in the receptacles therethrough.

The entrance-runway 20 opens into the feed-chamber 10 through an opening therein and is preferably provided with a top or cover 21 and is permanently open at the end 22 thereof, through which the animals are permitted to pass into the central chamber 10. This entrance-runway 20 is preferably provided near its front end with depending fingers, as 23, which are loosely hung on a bar 24, extending transversely across the top of the runway 20. These fingers swing freely and are designed for the purpose of getting the animals which frequent the trap accustomed to passing under an obstruction which they will find does not interfere with their passing out as well as into the structure.

A crank-shaft 24 is journaled in the sides of the runway 20, in front of the depending fingers, as 23, and is provided on the outside of said runway with a crank-handle 25. This crank-shaft is designed as a means for raising and holding in raised position the fingers, as 23, when it is so desired, by turning the crank-handle 25 up until it passes over and is supported by a pin or other projection 26 near the upper edge of the runway 20. To lower the fingers, the crank-handle 25 is disengaged from the pin 26 and turned downward away from the fingers, as 23, thereby causing them to drop into their normal depending position.

A gate 30 is journaled at its upper end in the opposite sides of the runway 20, near the top thereof, and is provided with an arc-shaped recess or cut-out portion at its lower edge. This gate may be made of any desired material and is preferably provided at its inner front face with a plate 31, riveted thereto and having an outwardly-extending flange 32. This plate 31 is preferably provided near its top with oppositely-disposed perforated ears, as 33, for receiving the opposite ends of a rod 34, which is provided with loosely-disposed freely-swinging fingers, as 35, similar to the fingers, as 23. These fingers, as 35, extend downwardly across the runway 20 and rest against the flange 32, which holds them in an inclined position. The lower ends of these fingers are preferably bent upwardly to facilitate the entrance of the animal into the trap thereunder.

A crank-shaft 36 is journaled in the sides of the runway 20 in front of the gate 30 and is provided on the outside of the runway with a crank-handle 37 for operating the crank-shaft 36 to raise or lower the gate 30. In normal position the crank-handle 37 is turned up and extends over and is held by a pin or projection 38 on the side of the runway 20. This position of the handle causes the shaft 36 to engage the gate 30 and raise it into horizontal position out of the path of the animals entering the runway. To lower the gate 30 into position to prevent the animals from going out after they have entered the chamber 10, the crank-handle 37 is turned down and sprung between two pins 39 and 39' on the side of the runway 20. These pins hold the handle against turning with the shaft 36 in contact with the gate 30, which is in lower or vertical position. The rat or other animal after passing in under the freely-swinging fingers, as 35, is prevented from coming out again by reason of the gate 30 being held by the crank-shaft 36 against outward movement.

In the operation of this trap or harbor it is preferably buried out of sight, or nearly so, in some place where stock will not bother it. Straw, hay, or old boards may be used as a covering, or it may be buried in the earth. The object in burying it is to make it more attractive to the animals, especially rats, which will not frequent a place that is too public. The nests or boxes, as 12, are preferably filled with hay or any material designed to make a comfortable bed for the animal, so that he will be satisfied with his surroundings and invite his family and relatives to share his good home.

Before the trap is covered up the crank-handle 37 is swung up into engagement with the pin 38, thereby holding the gate 30 in raised position out of the runway. The crank-handle 25 at the front of the entrance-runway is lowered to permit the depending fingers, as 23, to swing down across the path of the runway. The trap is then left undisturbed for some time until the animals which it is desired to trap get accustomed to going in and out of the harbor unmolested. When they find that they may come and go as they please, they will make it their permanent home and will go out at night and return in the day. After it has been ascertained by examining the trap that animals are frequenting it the operator will then turn the crank-handle 25 up into engagement with the pin 26 and hold the depending fingers, as 23, in horizontal position out of the animals' path. He then lowers the crank-handle 37 into engagement with the two pins 39 and 39' and permits the gate 30 to drop into vertical position and be held against outward-swinging movement. The animals being accustomed to entering under the fingers, as 23, will not notice the fingers, as 35, and will pass in unsuspiciously under them, whence they will proceed to their respective beds, as 12. The operator may then lower the doors, as 17, in front of the boxes, as 12, and remove the boxes with their occupants to any desired place and dispose of them. If properly attended to, a harvest of rats will be the reward.

I claim as my invention—

1. A trap having an entrance-runway, freely-swinging obstructing-bars disposed across the same, means to raise said obstructing-bars, a gate in said runway, behind the said bars, means to raise said gate and secure the same against outward movement, and obstructing-bars connected to and carried by said gate, free to swing inwardly therefrom and prevented by the gate from moving outwardly, substantially as described.

2. A trap provided with a swinging gate at the entrance thereto, a crank-shaft disposed adjacent to said gate and provided with a crank-handle, and means for locking said handle in adjusted position and holding said gate against outward movement.

3. A trap provided with a swinging gate at the entrance thereto, a crank-shaft disposed in front of said gate and having a crank-handle connected therewith, and pins disposed at various points on said trap for engaging said handle and holding it in adjusted position for locking the gate in the desired position.

In testimony that I claim the foregoing as my own I have hereto affixed my signature in the presence of two witnesses.

JOSEPH SAMUEL MOON.

Witnesses:
C. S. GRANT,
L. A. BYARLAY.